United States Patent

Kanoll

[11] Patent Number: 5,443,372
[45] Date of Patent: Aug. 22, 1995

[54] COUPLING MECHANISM FOR A COMPRESSOR

[75] Inventor: Hiroshi Kanoll, Gunma, Japan

[73] Assignee: Sanden Corporation, Isesaki, Japan

[21] Appl. No.: 114,188

[22] Filed: Sep. 1, 1993

[30] Foreign Application Priority Data

Sep. 2, 1992 [JP] Japan .............................. 4-067248 U

[51] Int. Cl.⁶ .............................................. F04B 9/00
[52] U.S. Cl. ........................................ 417/319; 464/32
[58] Field of Search ............... 417/223, 319; 474/902, 474/94; 464/32; 403/2

[56] References Cited

U.S. PATENT DOCUMENTS

| | | | |
|---|---|---|---|
| 490,313 | 1/1893 | Schlickeysen | 403/2 |
| 1,326,869 | 12/1919 | Junggren | 403/202 |
| 1,343,152 | 6/1920 | Olson | 474/902 |
| 1,498,281 | 6/1924 | Jones | 64/28 R |
| 2,892,329 | 6/1959 | Trigilio | 464/32 |
| 3,071,945 | 1/1963 | Shomo | 464/32 |
| 3,472,046 | 10/1969 | Potter | 464/32 |
| 3,662,619 | 5/1972 | Seeliger | 74/572 |
| 3,861,829 | 1/1975 | Roberts et al. | 417/53 |
| 4,040,766 | 8/1977 | Sekido et al. | 415/9 |
| 4,097,161 | 6/1978 | Weiss | 464/32 |
| 4,425,520 | 1/1984 | Hiraga | 310/92 |
| 4,574,930 | 3/1986 | Koitabashi | 192/84 C |
| 4,616,742 | 10/1986 | Matsushita | 192/84 C |
| 4,619,351 | 10/1986 | Takatoshi | 192/35 |
| 4,621,982 | 11/1986 | Schulz et al. | 417/201 |
| 4,624,354 | 11/1986 | Koitabashi | 192/84 C |
| 4,694,945 | 9/1987 | Koitabashi | 192/35 |
| 4,718,526 | 1/1988 | Koitabashi | 310/78 |
| 4,808,870 | 2/1989 | Gonda | 310/78 |
| 4,828,090 | 5/1989 | Matsushita | 192/84 C |
| 4,859,156 | 8/1989 | Kikuchi | 417/319 |
| 4,860,867 | 8/1989 | Nishimura | 192/84 C |
| 4,874,973 | 10/1989 | Matsushita et al. | 310/78 |
| 4,932,280 | 6/1990 | Becker et al. | 464/32 |
| 5,009,297 | 4/1991 | Gonda | 192/84 C |

Primary Examiner—Richard A. Bertsch
Assistant Examiner—Peter G. Korytnyk
Attorney, Agent, or Firm—Baker & Botts

[57] ABSTRACT

A coupling mechanism for a compressor of an automotive air conditioning system which is equipped with a safety mechanism for preventing damage to the engine due to compressor failure or malfunction. A front end plate with a tubular extension which extends in the direction parallel to the axis of rotation of the drive shaft is attached to one end of the compressor housing. A pulley is rotatably supported on said extension by means of a bearing. At its terminal end, the drive shaft is connected to an armature which includes a centrally located hole through which the drive shaft extends. The armature is connected by means of a bolt and a nut and rotates with the drive shaft. The pulley transmits rotational motion from the engine to the drive shaft through an armature plate by means of coupling plate members which are interposed between the pulley and the armature plate. Coupling plate members include breakaway portions which may be easily broken if excessive torque is applied due to compressor failure or malfunction. If the compressor failure or malfunction occurs and the drive shaft stops rotating, damage to the engine is avoided because the excessive torque applied by the pulley causes the breakaway portions of the coupling plate members to break and allows the pulley and coupling members to be disconnected from each other. This allows each to continue to rotate independently without contacting or biting each other.

32 Claims, 7 Drawing Sheets

COUPLING MECHANISM FOR A COMPRESSOR

BACKGROUND OF THE INVENTION

1. Field of the Invention

The invention relates to a coupling mechanism for a refrigerant compressor, and more particularly, to a mechanism for disconnecting the drive shaft of the compressor from a drive pulley in the event of a compressor failure or malfunction.

2. Description of the Prior Art

In a standard automotive air conditioning system, an electromagnetic clutch is interposed between the automotive engine and the drive shaft of the compressor to intermittently transmit the rotational driving force of the engine to the drive shaft. The operation of the electromagnetic clutch is controlled by a change in the operating conditions of the air conditioning system, e.g., a change of temperature in the passenger compartment.

In the event of a compressor failure or malfunction, the clutch should operate to disconnect the engine from the compressor to prevent transmission of the rotational driving force from the engine. Nevertheless, because the clutch is usually loaded in a compressor which has a variable displacement mechanism enabling the compressor to change its capacity in direct response to changes in operating conditions, the electromagnetic clutch is not necessary to obtain satisfactory control of the refrigeration or temperature condition of the air conditioning system. It is necessary, however, to provide the compressor with a safety mechanism to prevent damage to other parts of the engine or the air conditioning system in the event of a compressor failure or malfunction. The electromagnetic clutch serves as an expensive solution to this problem.

One example of an automotive air conditioning system compressor which does not made use of an electromagnetic clutch is disclosed in U.S. Pat. No. 3,861,829 to Roberts et al. Moreover, the present invention constitutes a novel and advantageous improvement over the coupling mechanism for compressors disclosed in U.S. Pat. No. 4,859,156 to Kirkuchi, which is incorporated herein by reference. As shown in the compressor of FIG. 1, the compressor includes compressor housing 10 and front end plate 11 attached to an open end of housing 10. Drive shaft 12 is rotatably supported within front end plate 11. Tubular extension 11a extends outwardly from front end plate 11 and surrounds drive shaft 12.

Pulley 14 is rotatably supported on the peripheral outer surface of tubular extension 11a through bearing 15. Pulley 14 is securely fitted on the peripheral outer surface of bearing 15 by snap ring 26 disposed between the inner surface of pulley 14 and the inner end surface, with respect to housing 10, of bearing 15. Moreover, snap ring 26 prevents pulley 14 from moving parallel to the rotational axis of drive shaft 12. Bearing 15 is secured between flange 11b and snap ring 19 which is fixed on the peripheral outer surface of tubular extension 11a.

Armature 13 has a centrally located hole and is secured on the terminal outer end portion of drive shaft 12 by a bolt 12a and a nut 33. Armature 13 is also coupled with drive shaft 12 by the interaction of key 20 on the end of drive shaft 12 with key groove 22 in the centrally located hole of plate-like element 13.

A plurality of cylindrical members 28 are disposed between the inner axial surface, with respect to housing 10, of armature 13 and the outer axial surface, also with respect to housing 10, of pulley 14 to couple armature 13 to pulley 14. Holes 13a are formed on the inner axial surface of armature 13, and one end of each cylindrical member 28 is disposed therein. The other end of each cylindrical member 28 is disposed in corresponding hole 14a formed on the outer axial surface of pulley 14. Cylindrical members 28 may be made of synthetic resins or metals which are easily broken if a large torque acts between pulley 14 and armature 13, i.e., a sufficiently large force which acts to rotate pulley 14 with respect to armature 13.

In ordinary operation of such a coupling mechanism, the driving force of the engine is transmitted to pulley 14 by a belt (not shown) and is then transferred to drive shaft 12 of a compressor through cylindrical members 28 and armature 13. In this manner, drive shaft 12 is rotated. If, during the operation of the compressor, a failure or malfunction occurs, and as a result of the failure or malfunction the rotation of drive shaft 12 is interrupted, the rotation of armature 13 is also interrupted due to the coupling of armature 13 with drive shaft 12. Nevertheless, a large rotational force is still provided to pulley 14 by the engine, and pulley 14 consequently provides a large torque to armature 13 through cylindrical members 28. This torque is sufficient to break cylindrical members 28 because cylindrical members 28 are designed to break when such a torque is applied. As a result, pulley 14 is disconnected from armature 13 and is free to rotate without resistance applied through armature 13 from motionless drive shaft 12. The maximum acceptable amount of torque and consequently, the size, material, and number of cylindrical members 28 is dependent on the air conditioning system and the compressor with which the coupling mechanism is used.

This configuration, however, has certain disadvantages. If the compressor should lock or become difficult to rotate due to compressor failure or malfunction, pulley 14 is subjected to excessive torque through cylindrical members 28. When this torque breaks cylindrical members 28, each cylindrical member 28 may be broken at a different location, i.e., one cylindrical member 28 may be broken on armature 13 side while another is broken on pulley 14 side. As a result, the broken sections of cylindrical members 28 contact or bite each other, and pulley 14 cannot be sufficiently disconnected from armature 13 to allow it to rotate freely. Therefore, the torque applied through these contacts or bites is likely to damage the engine and other parts of the driving system, such as the alternator, a cooling fan, or a power steering mechanism, which rotate together by the belt.

Further, in this configuration, the diameters of holes 13a of armature 13 and holes 14a of pulley 14 should be almost the same as the diameter of cylindrical member 28 because both ends of each cylindrical member 28 must be inserted tightly into holes 13a and holes 14a to securely connect armature 6 with pulley 14. Therefore, if these diameters are different from each other due to an error in manufacturing, it usually prevents the armature 13 from being secured to pulley 14 during assembly.

SUMMARY OF THE INVENTION

It is an object of this invention to provide an improved coupling mechanism for a driven member, e.g., a pulley, which prevents damage to an automotive engine in the event of a failure or malfunction of the driven member. The driven member may be a compressor for an automotive air conditioning system.

It is another object of this invention to provide an easily assembled coupling mechanism for a driven member.

According to the present invention, a coupling mechanism for a compressor comprises a compressor housing having an open end surface. A front end plate attaches to the open end surface of the compressor housing. A drive shaft is rotatably disposed within the compressor housing. The drive shaft has an outer end portion terminating outside of the compressor housing and a tubular extension extending outwardly from a front end plate parallel to the rotational axis of the drive shaft. A pulley is rotationally supported on a bearing fitted on a peripheral outer surface of the tubular extension. An armature includes a hub formed at a center of the armature and annular armature plate extending outwardly from the hub portion. The armature is connected to the outer end portion of the drive shaft. The coupling mechanism comprises coupling plate members including a first portion located at an inner radial end and a second portion located at an outer radial end of each of the plate members and a third portion located between each first portion and second portion. The third portion of the plate member connects the first portion to the second portion of the plate member.

These plate members are connected with the armature and the pulley at regular angular intervals around the circumference of the hub of the armature, so that the first portions of these plate members are secured to an axial end surface of the armature plate by at least one fastening means, and the second portions of the plate members are secured to an axial end surface of the pulley by at least one fastening means. Each plate member also includes at least one breakaway portion, i.e., a portion which fractures or gives way under a predetermined amount of torque or other applied mechanical force, formed at the third portion of the plate member. In one embodiment, breakaway portions are designed to be easily broken in the event that they receive a large torque due to compressor failure or malfunction. Further, the first portions of the plate members may be located on a first circular plane which is parallel to the axial surface of the pulley. The second portions of the plate members may be located on a second circular plane which is parallel to the axial surface of the pulley. The first portions of the plate members are positioned with respect to the second portions of the plate members, so that the material of each plate member will be elastically deformed, and the first plane is axially offset from the second circular plane. Therefore, if the compressor fails or malfunctions and the drive shaft stops rotating, damage to engine or the driving system is avoided because the torque applied by the pulley causes the breakaway portions to release the plate members from the pulley and to disconnect the armature plate from the pulley, so that each may rotate without contacting or biting the other.

Other objects, advantages, and features will be apparent when the detailed description of the invention and the drawings are considered.

DETAILED DESCRIPTION OF THE PREFERRED EMBODIMENTS

Figure 1:
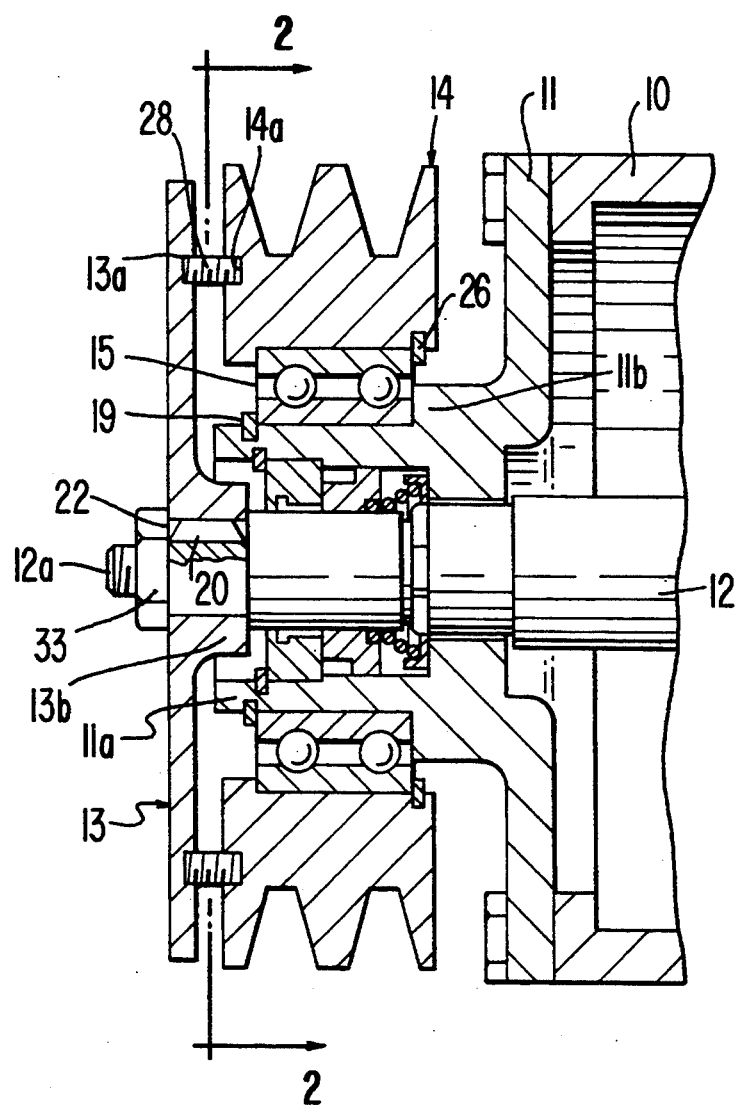
FIG. 1 is a cross-sectional view of a conventional coupling mechanism used on a compressor in accordance with the prior art.
Figure 2:
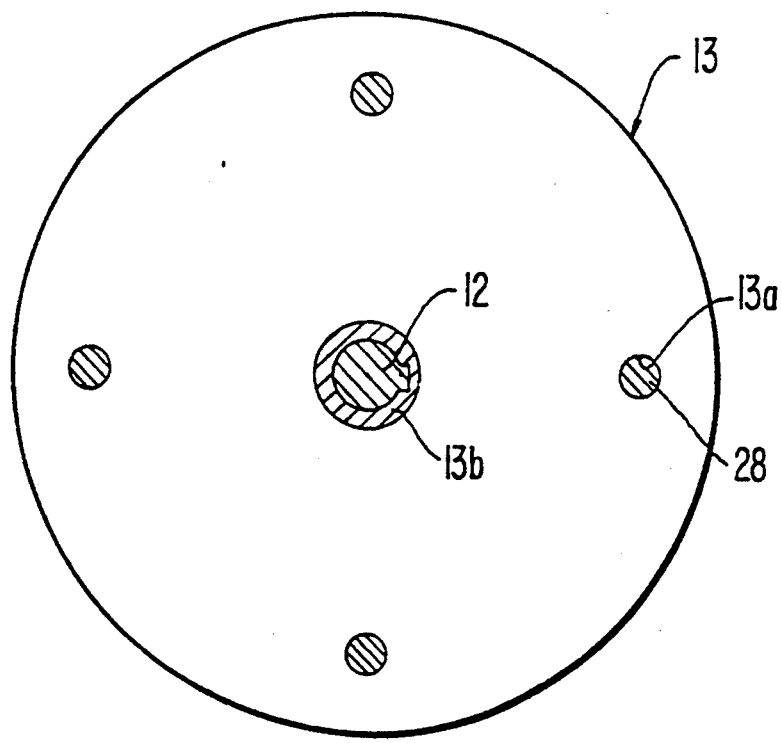
FIG. 2 is a cross-sectional view of an armature and a coupling plate member of a coupling mechanism taken along line 2—2 of FIG. 1.

The preferred embodiments of the present invention share many components with the compressor depicted in FIG. 1 except for the construction of coupling mechanism between a drive shaft and a pulley. Therefore, similar parts are represented by the same reference numerals as in FIG. 1, and the detailed description of the similar parts will be omitted in order to simplify the following description of the preferred embodiments.

Figure 3:
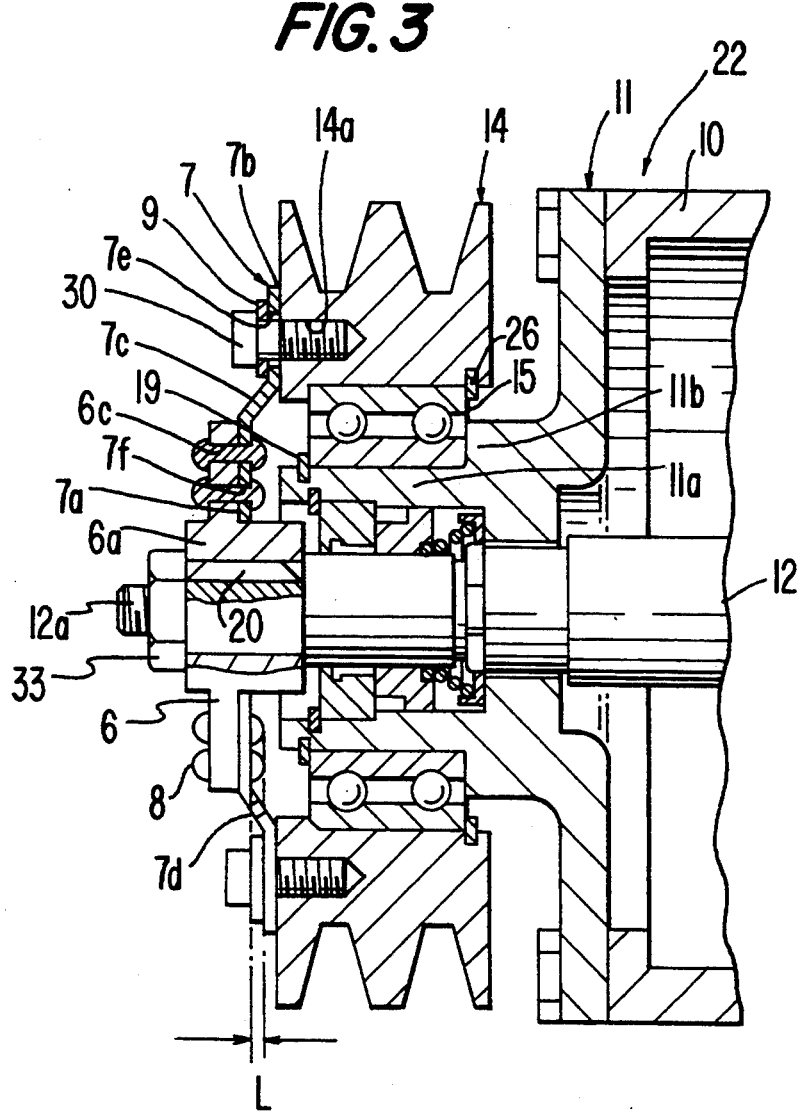
FIG. 3 is a cross-sectional view of a conventional coupling mechanism used on a compressor in accordance with first embodiment.
Figure 4A:
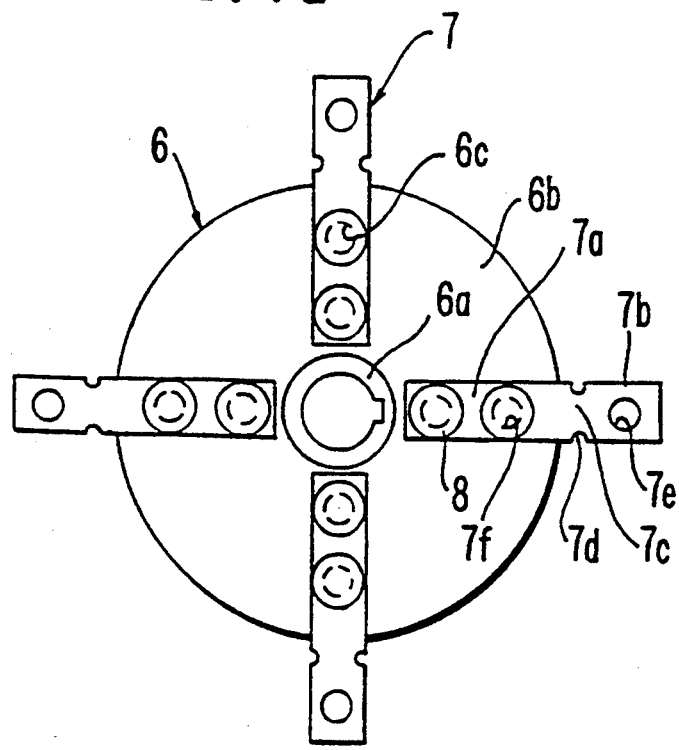
FIGS. 4a–b are rear end views of armatures and a coupling plate member of coupling plate members of the mechanism shown in FIG. 3.
Figure 4B:
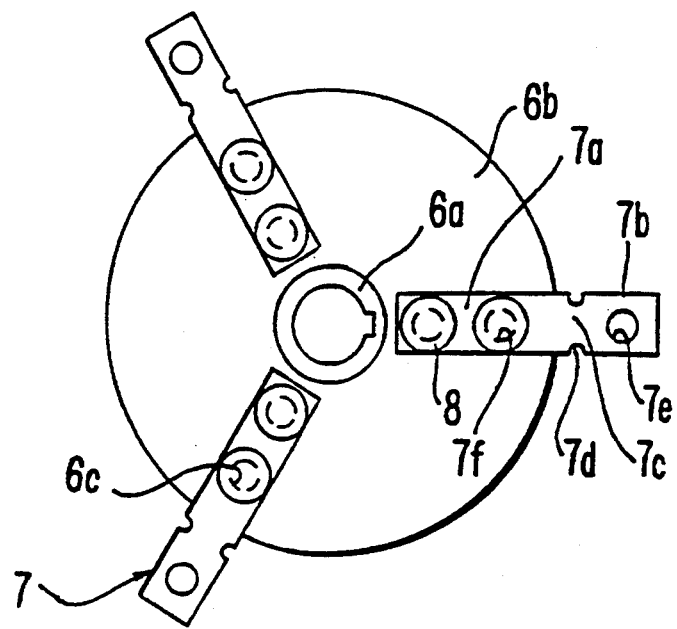

Referring to FIGS. 3 and 4a–b, a coupling mechanism according to a first embodiment of the present invention is depicted. Pulley 14 includes a plurality of holes 14a, e.g., four holes 14a, formed in an axial end surface of pulley 14 for connecting pulley 14 with coupling plate 7. Holes 14a of pulley 14 are spaced at regular angular intervals, i.e., 90°, around the circumference of pulley 14 and around the axial center of pulley 14. Armature 6 includes hub 6a formed as a cylinder and armature plate 6b formed as annular plate extending from the axial end of hub 6a. Armature plate 6b includes a plurality of holes, e.g., four pairs of holes 6c, formed in armature plate 6b. Four pairs of holes 6c are formed at regular angular intervals, i.e., 90°, around the circumference of armature plate 6b and around hub 6a. Coupling plate member 7, which is rectangular in shape, divides plate member 7 into an inner plate portion 7a having a plurality of holes 7f, e.g., two holes 7f, a center plate portion 7c in the center of plate member 7, and outer plate portion 7b having at least one hole 7e. Center plate portion 7c is formed between inner plate portion 7a and outer plate portion 7b and includes a notched or breakaway portion 7d which is partly cut-out from plate member 7. Thus, the width of center plate portion 7c is more slender than any other portion of plate member 7, so that plate member 7 may be easily broken at center plate portion 7c when excessive torque is applied. Four plate members 7 may be radially placed on the inner axial surface of armature 6 at regular angular intervals of 90° around the circumference of armature 6 and around hub 6a and may be connected with armature 6 by four pairs of rivets 8, so that four pairs of holes 7f of plate members 7 correspond to and are aligned with four pairs of holes 6c of armature plate 6b. Further, plate member 7 may be made of an elastic material.

Four plate members 7 are also secured to pulley 14 at regular angular intervals of 90° around the circumference of pulley 14 and around a radial surface of drive shaft 12, so that bolts 30 pass through washer 9 and holes 7e of each plate member 7. Bolts 30 screw into holes 14a of pulley 14, and outer plate portions 7b are axially offset from inner plate portion 7a. Center plate portions 7c are inclined toward pulley 14, thereby elastically deforming the material for plate member 7. If a distance L extends between the axial inner surface of plate member 7 which is secured to armature plate 6b by rivets 8 and the axial outer surface of plate member 7 which secured to pulley 14 by bolts 10, distance L must be greater than zero. Alternatively, plate member 7 and pulley 14 and armature 6 may not be provided with any holes for connecting by bolts 30 or rivets 8. Instead, armature 6 may be connected to pulley 14 through plate member 7 by means of brazing, spot welding, or the like.

Figure 5A:
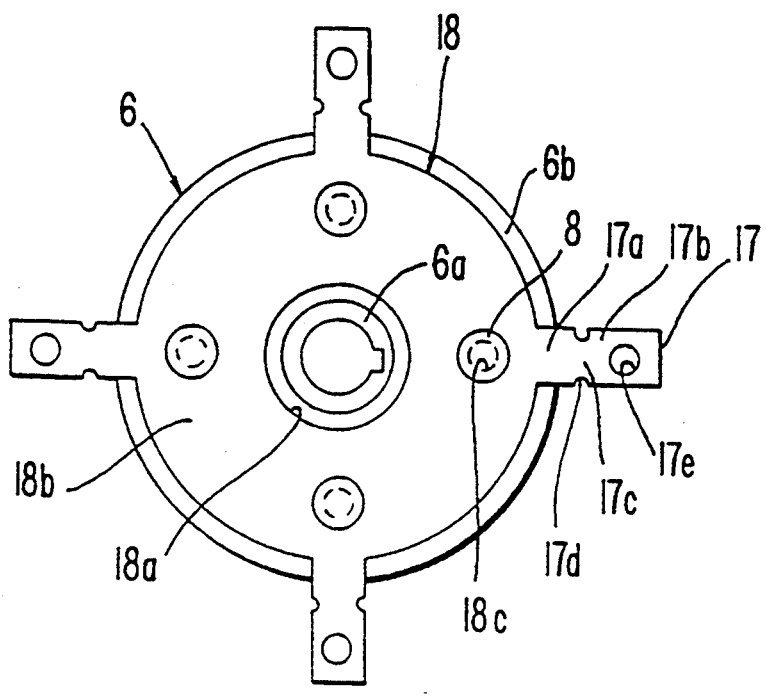
FIGS. 5a–b are rear end views of modified armatures and coupling plate members of a coupling mechanism in accordance with a second embodiment of this invention.
Figure 5B:
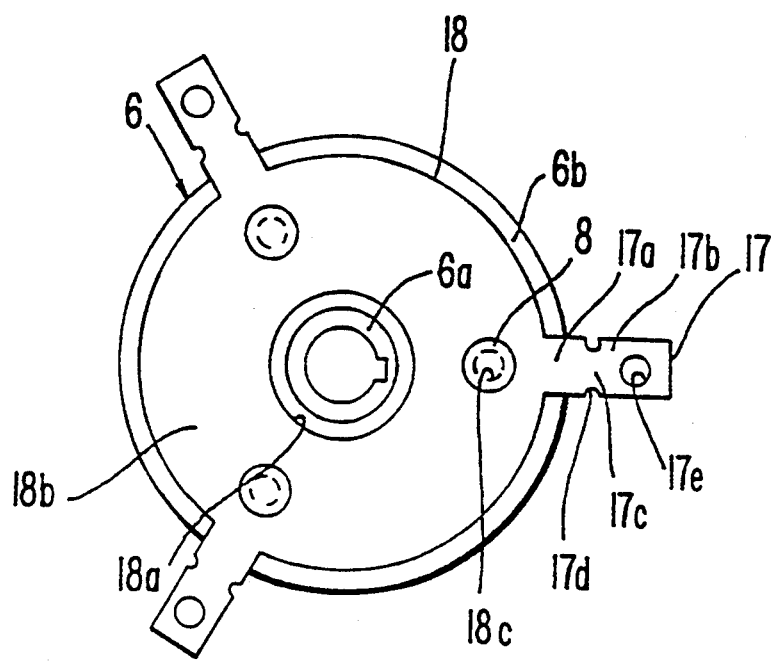

Referring to FIGS. 3 and 5a–b, a coupling mechanism according to a second embodiment of the present invention is depicted. Coupling plate member 18 includes center hole 18a formed in the center of plate member 18 through which hub 6a passes and an annular portion 18b extending outward from the radial edge of center hole 18a. Plate member 18 includes a plurality of holes 18c, e.g., four holes 18c, formed at regular angular intervals, e.g., 90°, around the circumference of plate member 18 and around hub 6a. Projection 17 is rectangular shaped and extends outward from the radial edge of annular portion 18b. Projection 17 is divided into inner plate portion 17a, center plate portion 17c, and outer plate portion 17b which has at least one hole 17e. Center plate portion 17c is formed between inner plate portion 17a and outer plate portion 17b and includes notched or breakaway portion 17d partly cut out from projection 17. Notched portion 17d is more slender than any other portion of plate member 18, so that it may easily break center plate portion 17c when excessive torque is applied. Plate 18 member is connected with armature 6 by a plurality of rivets 8, e.g., four rivets 8, at regular angular intervals of 90° around the circumference of armature 6 and around hub 6a, so that holes 18c correspond to and are aligned with holes 6c of armature 6. Further, plate member 18 is secured to pulley 14 through washer 9 with bolts 30 at regular angular intervals of 90° around the circumference of plate member 18 and around a radial surface of drive shaft 12, so that bolts 30 pass through washer 9 and holes 17e of projection 17 and screw into holes 14a of pulley 14. Outer plate portions 17b are axially offset to inner plate portion 17a and center plate portions 17c are inclined toward pulley 14, thereby elastically deforming the material for coupling plate 18. Alternatively, projection 17 and pulley 14 and armature 6 may not be provided with any holes for connecting by bolts 30 or rivets 8. Instead, armature 6a–b may be coupled with pulley 14 through coupling plate 17 by means of brazing, spot welding, or the like.

Figure 6A:
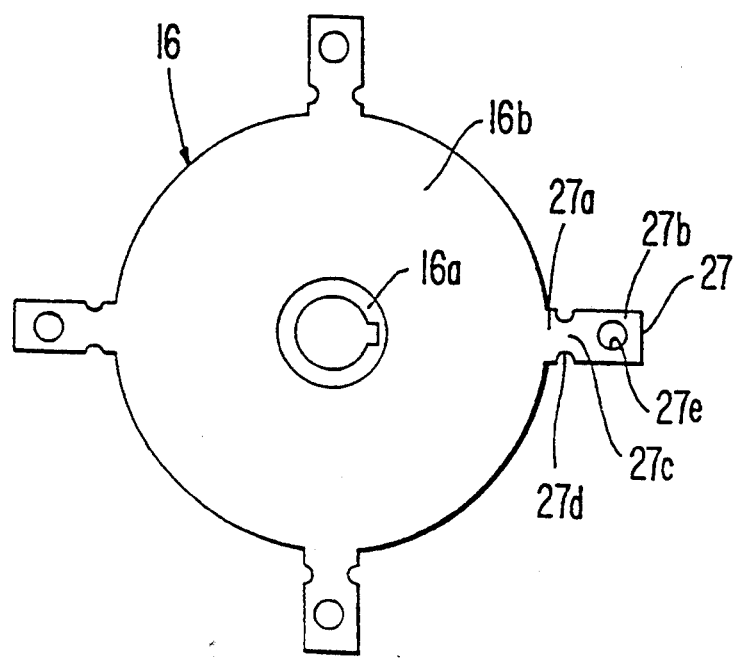
FIGS. 6a–b are rear end views of modified armatures and coupling plate members of a coupling mechanism in accordance with a third embodiment of this invention.
Figure 6B:
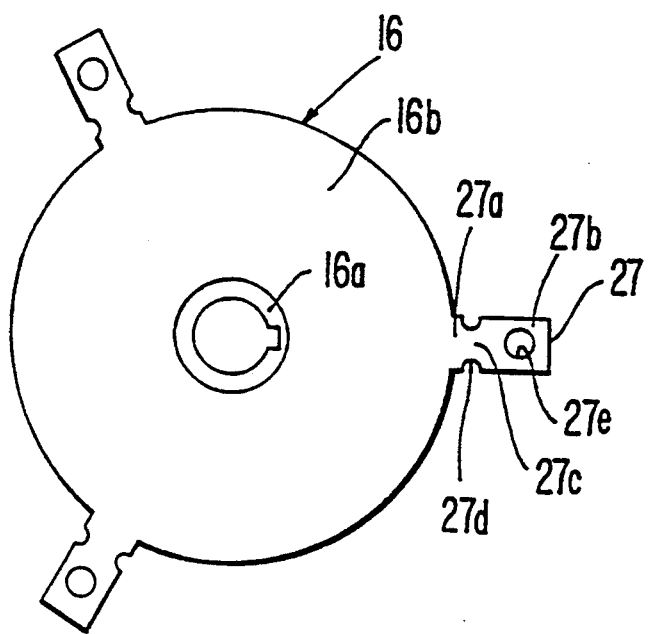

Referring to FIGS. 3 and 6, a coupling mechanism according to a third embodiment of the present invention is depicted. Armature 16 includes cylindrical hub 16a and annular armature plate 16b extending outward from the axial end of hub 16a. Armature 16 also includes a plurality of projections 27, e.g., four projections 27, which are rectangular shaped and extend outwardly from the axial edge of armature plate 16b. Projections 27 are radially arranged at regular angular intervals, e.g., 90°, around the circumference of armature plate 16b and around hub 16a of armature 16. Projection 27 includes inner plate portion 27a, center plate portion 27c, and outer plate portion 27b which has at least one hole 27e. Center plate portion 27c is formed between inner plate portion 27a and outer plate portion 27b and includes notched portion 27d partly cut out from projection 27. Notched portion 27d is more slender than any other portion of projection 27, so that it may easily break in center plate portion 27c when a large torque is applied. Further, armature 16 and projection 27 may be made of an elastic material.

Projections 27 may be secured to pulley 14 by bolts 30 at regular angular intervals, e.g., 90°, around the circumference of pulley 14 and around a radial surface of drive shaft 12, so that bolts 30 pass through washer 9 and holes 27e of projection 27 and screw into hole 14a of pulley 14. Outer plate portions 27b are axially offset from inner plate portions 27a, and center plate portions 27c are inclined toward pulley 14, thereby elastically deforming the material of armature 16 and 27.

Figure 7:
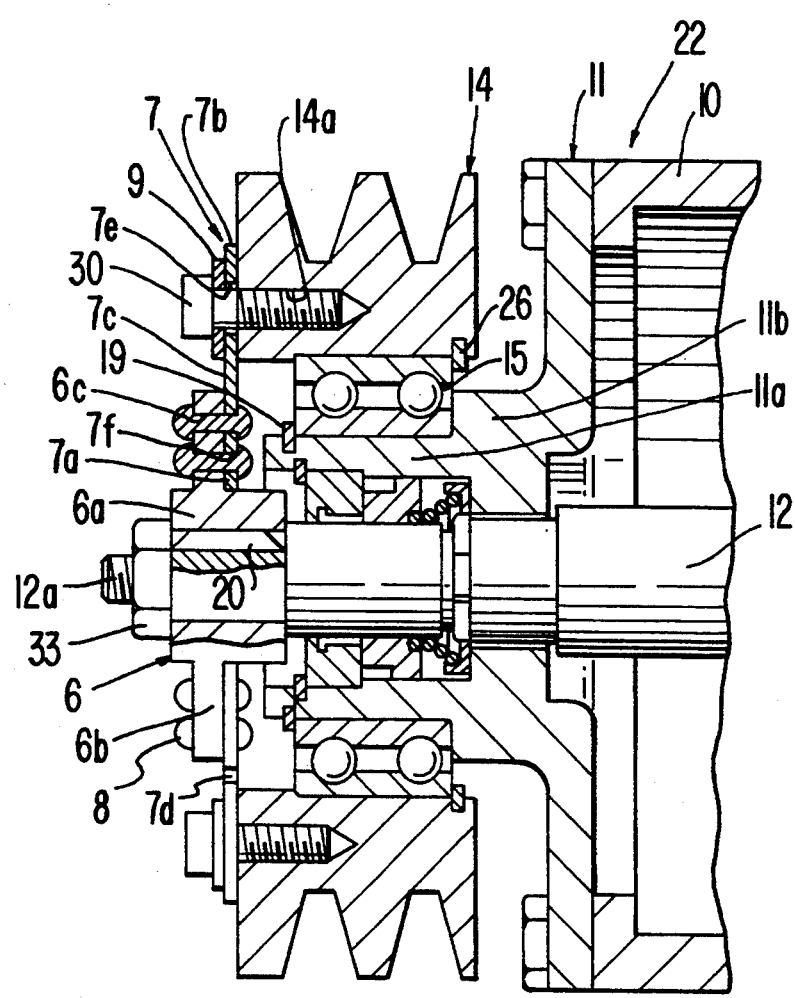
FIG. 7 is a cross-sectional view of a conventional coupling mechanism in accordance with a fourth embodiment of this invention.

Referring to FIGS. 4a–b and 7, a coupling mechanism according to a fourth embodiment of the present invention is depicted. This embodiment is similar to a foregoing embodiment except for the construction of the connecting system between coupling plate member 7 and pulley 14. Four plate members 7 are secured to pulley 14 at regular angular intervals of 90° around a circumference of pulley 14 and around a radial surface of drive shaft 12, so that bolts 30 pass through washer 9 and holes 7e of plate member 7 and screw into holes 14a of pulley 14. Each notched or breakaway portion 7d of plate member 7 is formed, such that it is located at a predetermined radius from hub 6a of armature 6. Thus, center plate portion 7c remain intact without being offset from or inclining toward pulley 14.

During assembly, referring to FIGS. 3 and 4a–b, four coupling plates 7 are secured to armature 6 by four pairs of rivets 8, so that holes 6c of armature 6 correspond to and are aligned with holes 7f of plate members 7. Four plate members 7 are secured to pulley 14, so that four holes 7e of plate member 7 correspond to and are aligned with four holes 14a of pulley 14, and bolts 30 pass through washer 9 and four holes 7e and screw into holes 14a of pulley 14. In this embodiment, the diameter of hole 7e is designed to be larger than the diameter of hole 14a of pulley 14. Therefore, unlike the prior art, if alignment between the center of hole 7e and the center of hole 14a varies due to the circumferential and radial variations in the assembly of the invention, armature plate 6b can be easily and quickly secured to pulley 14 by adjusting the center position of hole 7e.

Referring to FIG. 3, if a failure or compressor malfunction occurs during the operation, pulley 14 may be subjected to excessive torque through coupling plate member 7 and bolts 30. This torque may be sufficient to destroy center plate portion 7c of plate member 7 because the center portion 7c is designed to breakaway at breakaway portion 7d when such excessive torque is experienced. The maximum amount of torque which the center portion 7c is designed to withstand and the size, material, and number of coupling plate members depends on the air conditioning system and the compressor in which the coupling mechanism is used. Therefore, when center portion 7c breaks away, pulley 14 is disconnected from plate members 7 and is free to rotate without the resistance caused by the rotation of drive shaft 12 as applied to pulley 14. When center plate portion 7c is broken at breakaway portion 7d, one broken section of center plate portion 7c on inner plate side is separated from and radially parallel to the other broken section of center plate portion 7c on outer plate portion 7b side. The broken sections do not contact each other because center plate portion 7b is no longer subject to elastic deformation and portions 7a and 7b of plate member may rotate on parallel planes. Moreover, the distance L is large enough to prevent contact or biting between the broken sections.

Referring to FIG. 7, if the compressor failure or malfunction of during the operation, pulley 14 is subjected excessive torque through coupling plate members 7 and bolts 30 due to a compressor failure. Center plate portions 7c are broken at breakaway portions 7d in this configuration. The broken sections of center plate portion 7c remaining on inner plate portion 7a are separated from the other broken sections of center plate portion 7c remaining on outer plate portion 7b and do not contact each other because notched breakaway 7d of plate member 7 are located at a predetermined radius from hub 6a of armature 6.

As a result, if the compressor failure or malfunction occurs, coupling plate members 7 are broken at the location of breakaway portions 7d which are located at the predetermined radius from hub 6a of armature 6. One broken section of plate member 7 remaining attached to armature 6 does not contact or bite the other broken section of plate member 7 remaining attached to pulley 14. Therefore, unlike the prior art, the invention avoids damaging the engine and other parts of the driving system, such as an alternator, a cooling fan, a power steering which rotates together by a belt.

Although a detailed description of preferred embodiments of the present invention has been provided above, it is to be understood that the scope of the invention is not to be limited thereby, but is to be determined by the claims which follow.

I claim:

1. A coupling mechanism for a compressor, said compressor comprising a compressor housing having an open end surface, a front end plate attached to said open end surface of said compressor housing, a drive shaft rotatably disposed within said compressor housing, said drive shaft having an outer end portion terminating outside of said compressor housing, and a tubular extension extending outwardly from said front end plate parallel to the rotational axis of said drive shaft, a pulley rotationally supported on a bearing fitted on a peripheral outer surface of said tubular extension, an armature including a hub formed at a center of said armature and an armature plate extending outwardly from said hub, said armature connected to said outer end portion of said drive shaft, the improvement comprising:

said coupling mechanism including at least two coupling plate members, each of said plate members including a first portion located at an inner radial end of said plate member, a second portion located at an outer radial end of said plate member, and a third portion located between said first portion and said second portion; said third portion connecting said first portion to said second portion and said plate members radially connected with said armature plate and said pulley at regular angular intervals around a circumference of said hub of said armature, so that said first portion of each of said plate members is secured to an axial end surface of said armature plate by at least one fastening means and said second portion of each of said plate members is secured to an axial end surface of said pulley by at least one fastening means, each of said plate members including at least one breakaway portion formed in said third portion of said plate member.

2. The coupling mechanism of claim 1 wherein said first portions of said plate members are located in a first plane which is parallel to an axial surface of said pulley, and said second portions of plate members are located in a second plane which is parallel to an axial surface of said pulley, said first plane axially offset from said second plane.

3. The coupling mechanism of claim 1 wherein said breakaway portion of said plate member is formed by at least one notch cut from said third portion of said plate member.

4. The coupling mechanism of claim 1 wherein said breakaway portion of said plate member is located at a predetermined radius from with said drive shaft.

5. The coupling mechanism of claim 1 wherein said pulley includes a plurality of holes which are positioned at regular angular intervals around a circumference of an axial end surface in said drive shaft, and said armature plate includes a plurality of holes which are positioned at regular angular intervals around a circumference of said hub of said armature, and said first portion of said plate member includes at least one hole formed in a center of such first portion, and said second portion of said plate member includes at least one hole in a center of said second portion, said plate members are secured to said armature plate at regular angular intervals around a circumference of said hub of said armature, so that said fastening means pass through said holes of said plate member and said holes of said armature plate, said plate members being secured to said pulley at regular angular intervals around a circumference of said drive shaft, so that said fastening means pass through said holes of said plate member and screw into said holes of said pulley, wherein the diameter of each of said holes of said plate member is larger than the diameter of said fastening means.

6. The coupling mechanism of claim 5 wherein said pulley includes two holes formed radially opposite to each other around the circumference of said drive shaft in said axial end surface of said pulley, and said armature plate includes two holes formed radially opposite to each other around the circumference of said hub of said armature.

7. The coupling mechanism of claim 5 wherein said pulley includes three holes formed at a regular angular intervals of 120° around the circumference of said drive shaft in said axial end surface of said pulley, and said armature plate includes three holes formed at regular angular intervals of 120° around the circumference of said hub of said armature.

8. The coupling mechanism of claim 5 wherein said pulley includes four holes formed at a regular angular intervals of 90° around the circumference of said drive shaft in said axial end surface of said pulley, and said armature plate includes four holes formed at regular angular intervals of 90° around the circumference of said hub of said armature.

9. The coupling mechanism of claim 1 wherein said plate member includes said breakaway portion formed by a pair of notches on opposite sides of said third portion of said plate member.

10. The coupling mechanism of claim 1 wherein said first portions of said plate members are spot welded to an axial end surface of said armature plate, and said second portions of said plate member are spot welded to an axial end surface of said pulley.

11. The coupling mechanism of claim 1 wherein said coupling mechanism includes two plate members, said plate members being radially secured to said armature plate and said pulley and radially opposed to each other around the circumference of said hub of said armature.

12. The coupling mechanism of claim 1 wherein said coupling mechanism includes three plate members, said plate members being radially secured to said armature plate and said pulley and spaced at regular angular intervals of 120° around the circumference of said hub of said armature.

13. The coupling mechanism of claim 1 wherein said coupling mechanism includes four plate members, said plate members being radially secured to said armature plate and said pulley and spaced at regular angular intervals of 90° around the circumference of said hub of said armature.

14. A coupling mechanism for a compressor, said compressor comprising a compressor housing having an open end surface, a front end plate attached to said open end surface of said compressor housing, a drive shaft rotatably disposed within said compressor housing, said drive shaft having an outer end portion terminating outside of said compressor housing, and a tubular extension extending outwardly from said front end plate parallel to the rotational axis of said drive shaft, a pulley rotationally supported on a bearing fitted on a peripheral outer surface of said tubular extension, an armature including a hub formed at a center of said armature and an armature plate extending outwardly from said hub, said armature plate connected to said outer end portion of said drive shaft, the improvement comprising:

said coupling mechanism including a coupling plate member, said plate member including a hole formed through a center of said plate member and an annular portion extending outwardly from the radial edge of said hole of said plate member and at least two projections outwardly extending at regular angular intervals around a circumference of said annular portion, each of said projections including a first portion located at an inner radial end of each of said projections, a second portion located at an outer radial end of each of said projections, and a third portion located between and connecting said first portion and said second portion, said plate member being secured to said armature plate, so that said annular portion of said plate member is concentrically secured to an axial end surface of said armature plate by at least two fastening means, said plate member secured to said pulley at regular angular intervals around a circumference of said drive shaft, so that said second portions of said projections are secured to an axial end surface of said pulley by at least one fastening means, each of said projections including at least one breakaway portion.

15. The coupling mechanism of claim 14 wherein said first portions of said projections are located on a first plane which is parallel to an axial surface of said pulley, and said second portions of said projections are located on a second plane which is parallel to an axial surface of said pulley, said first plane being axially offset from said second plane.

16. The coupling mechanism of claim 14 wherein said breakaway portion of each of said projections is formed by at least one notch cut out from said third portion of said projection.

17. The coupling mechanism of claim 14 wherein said breakaway portion is located at a predetermined radius from said drive shaft.

18. The coupling mechanism of claim 14 wherein said first portion of each of said projections is spot welded to an axial end surface of said armature plate and said second portion of each of said projections is spot welded to an axial end surface of said pulley.

19. The coupling mechanism of claim 14 wherein said pulley includes a plurality of holes formed at regular angular intervals around a circumference of said drive shaft in an axial end surface of said pulley, and said armature plate includes a plurality of holes formed at regular angular intervals around a circumference of said hub of said armature, and said first portion of said plate member includes at least one hole formed in a center of said first portion, and said second portion of said projection include at least one hole formed in a center of said second portion, said projection being connected with said armature plate at regular angular intervals around a circumference of said hub of said armature, so that connecting means pass through said holes of said projections and said holes of said armature plate, said projections connected with said pulley at regular angular intervals around a circumference of said pulley, so that connecting means pass through said holes of said projections and screw into said holes of said pulley, wherein the diameter of each of said holes of said projection is larger than the diameter of said connecting means.

20. The coupling mechanism of claim 19 wherein said pulley includes two holes formed on radially opposing sides around a circumference of said drive shaft in an axial end surface of said pulley, and said armature plate includes two holes formed on opposing radially sides around a circumference of said hub of said armature.

21. The coupling mechanism of claim 19 wherein said pulley includes three holes formed at regular angular intervals of 120° around a circumference of said drive shaft in axial end surface of said pulley, and said armature plate includes three holes formed at regular angular intervals of 120° around a circumference of said hub of said armature.

22. The coupling mechanism of claim 19 wherein said pulley includes four holes formed at regular angular intervals of 90° around a circumference of said drive shaft in axial end surface of said pulley, and said armature plate includes four holes formed at regular angular intervals of 90° around a circumference of said hub of said armature.

23. The coupling mechanism of claim 14 wherein each of said breakaway portion is formed by a pair of notches cut on opposite sides of said third portion of said projection.

24. A coupling mechanism for a compressor, said compressor comprising a compressor housing having an open end surface, a front end plate attached to said open end surface of said compressor housing, a drive shaft rotatably disposed within said compressor housing, said drive shaft having an outer end portion terminating outside of said compressor housing, and a tubular extension extending outwardly from said front end plate parallel to the rotational axis of said drive shaft, a pulley rotationally supported on a bearing fitted on a peripheral outer surface of said tubular extension, an armature connected; to said outer end portion of said drive shaft, the improvement comprising:

said coupling mechanism comprising said armature including a hub formed at a center of said armature and an annular plate extending outwardly from said hub and at least two projections extending outwardly at regular angular intervals around a circumference of said hub from an outer radial edge of said annular plate, each of said projections including a first portion located at an inner radial end of said projection, a second portion located at an outer radial end of said projection, and a third portion located between said first portion and said second portion to said second portion, said armature plate connected with said pulley, so that said second portions of said projections are secured to an axial end surface of said pulley by at least one fastening means, each of said projections including at least one breakaway portion.

25. The coupling mechanism of claim 24 wherein said first portions of said projections are located in a first plane which is parallel to an axial surface of said pulley, and said second portions of said projections are located in a second plane which is parallel to an axial surface of said pulley, said first plane being axially offset from said second plane.

26. The coupling mechanism of claim 24 wherein said breakaway portion of said projection is formed by at least one notch cut from said third portion of said projection.

27. The coupling mechanism of claim 24 wherein said breakdown portion of said projection located at a predetermined radius from said drive shaft.

28. The coupling mechanism of claim 24 wherein said pulley includes a plurality of holes formed at a regular angular intervals around a circumference of said drive shaft in an axial end surface of said pulley, and said first portion of said projection includes at least one hole formed in a center of each of said first portions, said projections being connected with said pulley, so that connecting means pass through said holes of said projections and screw into said holes of said pulley, wherein the diameter of each of said holes of said projections is larger than the diameter of said connecting means.

29. The coupling mechanism of claim 28 wherein said pulley includes two holes formed radially opposite to each other around a circumference of said drive shaft in an axial end surface of said pulley, and said armature plate includes two projections formed radially opposite to each other around a circumference of said hub of said armature.

30. The coupling mechanism of claim 28 wherein said pulley includes three holes formed at a regular angular intervals of 120° around a circumference of said drive shaft in axial end surface of said pulley, and said armature plate includes three projections formed at regular angular intervals of 120° around a circumference of said hub of said armature.

31. The coupling mechanism of claim 28 wherein said pulley includes four holes formed at regular angular intervals of 90° around a circumference of said drive shaft in axial end surface of said pulley, and said armature plate includes four projections formed at regular angular intervals of 90° around a circumference of said hub of said armature.

32. The coupling mechanism of claim 24 wherein each of said breakaway portions is formed by a pair of notches cut on opposite sides of said third portion of said projection.

* * * * *

UNITED STATES PATENT AND TRADEMARK OFFICE
CERTIFICATE OF CORRECTION

PATENT NO. : 5,443,372
DATED     : August 22, 1995
INVENTOR(S) : Hiroshi KANOU

It is certified that error appears in the above-indentified patent and that said Letters Patent is hereby corrected as shown below:

On the title page, under item [19] and item [75], delete "Kanoll" and insert --Kanou--.

Signed and Sealed this

Tenth Day of June, 1997

*Attest:*

BRUCE LEHMAN

*Attesting Officer*   *Commissioner of Patents and Trademarks*